Jan. 18, 1938.  O. L. OLSON  2,105,611

AUTOMATIC SAFETY SWITCH

Filed May 15, 1936

INVENTOR:
Oscar L. Olson
BY David E. Carlsen
ATTORNEY

Patented Jan. 18, 1938

2,105,611

UNITED STATES PATENT OFFICE 2,105,611

AUTOMATIC SAFETY SWITCH

Oscar L. Olson, Cambridge, Minn., assignor of one-half to Bernard E. Aurelius and Eugene A. Aurelius, Braham, Minnesota Application May 15, 1936, Serial No. 79,867

3 Claims. (Cl. 200—83)

My invention relates to a safety switch device adapted particularly for use on motor vehicles although it is applicable for airplane and stationary engines.

This device is a simple and highly efficient accessory connected to the pressure gage line as on an automobile, between the gage and the oil pump. The main object of this device is to provide means for automatically opening the electric circuit to stop the engine, as of an automobile, at such time as the quantity of oil in the engine has reached a minimum or a level which would be ruinous or at least injurious to the further operation of the engine. This device furthermore is so made that if the electric circuit is opened by it the device may be manipulated for temporary driving or running of the engine until the oil in the engine may be replenished. The damaging results from too small a quantity of lubricant in an engine are well known but the use of my device eliminates such damage. This device may of course be installed in automobiles as part of original equipment but may easily be installed in any type of automobile.

Figure 1:
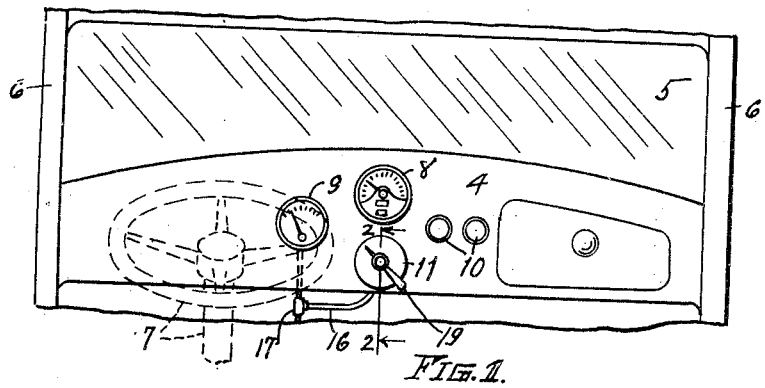
Figure 3:
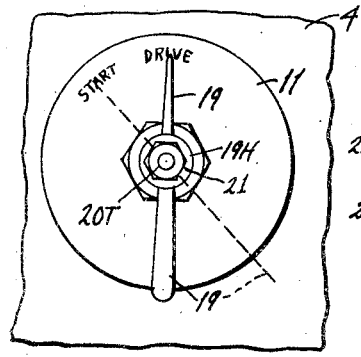
Figure 2:
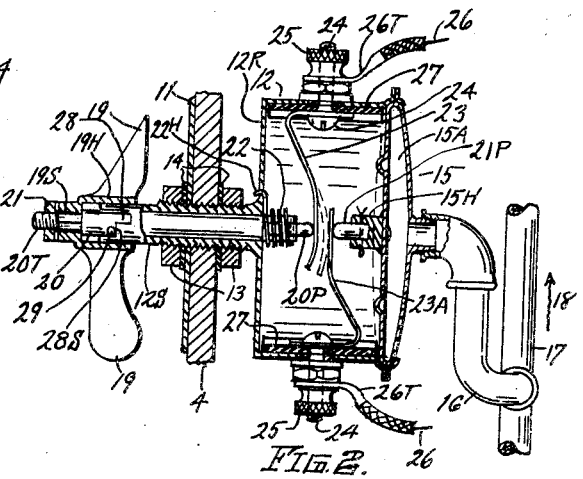

In the accompanying drawing:

Fig. 1 is an elevation mainly of the instrument board of an automobile and adjacent parts, and my device in operative position on said instrument board. Fig. 2 is an enlarged approximately full size sectional view as on line 2—2 in Fig. 1, being a longitudinal section through my device. Fig. 3 is a face view of the manipulating lever and indicator of my device and its adjacent dial plate on the instrument board.

Referring to the drawing by reference numerals, 4 designates the instrument board of an automobile, 5 the windshield, 6 the right and left front corner posts of the car body, 7 (in dotted line) the steering wheel and column, 8 the speedometer, 9 the pressure gage, and 10 the usual spark and gas control rod buttons, all in approximately correct proportion and positions as in automobile design.

My device includes a dial plate 11 fixed on the instrument board at a convenient location, shown just below the speedometer 8 in Fig. 1 and approximately central of the board 4.

12 is a horizontally cylindrical body or chamber with a closed rear end 12R from which extends rearwardly and centrally a hollow shaft 12S through registering apertures in the instrument board and the center of the dial 11. The said stem is threaded exteriorly to be engaged by suitable nuts and spring washers 13—14 to hold the cylindrical body rigidly in position just forward of the instrument board. The front end of the body 12 retains a hollow circular and expansible diaphragm 15 (see Fig. 2) of the so-called wafer type having an air chamber 15A communicating directly by means of piping 16 to the usual pipe 17 in which air pressure operates the indicator 9 to show oil pressure condition when the car engine is in operation air pressure being in direction indicated by arrow 18.

The rear extremity of stem 12S is smooth exteriorly and slidably engaged by the forward bore of a hub 19H of a lever 19, the rear part of the bore of said hub being preferably a square bore as at 19S to engage a correspondingly shaped rear part of the oscillatable and reciprocable shaft 20 retained in the bore of the stem 12S and extending into the housing 12. The rear end of shaft 20 is threaded as at 20T for a nut 21 which holds the lever 19 rigidly in place.

The shaft or pin 20 is oscillated by both manual and automatic action for the purpose of closing and opening electric circuit within the housing, as will now be described, it being understood at this time that an object of my device is to open or break circuit of a car when the volume of oil in its engine becomes dangerously low for safe driving.

The pin 20 extends into the housing 12 a predetermined distance (see Fig. 2) said end bored to retain a removable contact peg 20P of non-conductive material. Said inner part of the pin 20 is encircled by a tension coil spring 22 one end of which is fixed to the pin 20 at its end and may simultaneously hold the peg 20P in place, the other end of said spring suitably hooked as at 22H in the rear wall or head 12R. This being a tension spring the pin 20 is normally impelled rearwardly (to the left in Fig. 2). The exposed end of peg 20P continuously contacts a flat leaf spring 23 extending radially of the housing and fixed by means of a screw 24 to the upper part of the housing 12 said screw 24 holding the entire leaf spring 23 rigidly positioned and the screw is exposed outwardly of the housing where it carries a nut 25 by means of which a terminal 26T of a circuit wire 26 is retained. A similar leaf spring 23A extends toward the diametrically opposite side of the housing 12 and is retained by a screw 24 having nut 25 to clamp another circuit wire terminal 26T of wire 26. Under the head of each screw 24 is a resilient non-conductive plate 27 against which the leaf spring is pressed and retains the affected parts in rigid correct relation to each other and providing necessary insulation. The overlapping free inner ends of the leaf springs are normally in spaced parallel relation as shown in full lines in Fig. 2. The front side of the lower leaf spring 23A is contacted by a non-conductive peg 21P removably fixed in the central hub 15H of the inner wafer member of the diaphragm 15. At this point it will be readily understood that electric circuit 26 is broken at and between the inner ends of the spring leaves 23—23A.

Obviously when the engine is in operation and its oil pump sets up air pressure in line 17 and through 16 to the diaphragm 15 the latter expands pushing the peg 21P inward to contact the spring leaves and thus maintain a closed electric circuit and continues to do so as long as sufficient air pressure exists in the line and the diaphragm. However, when the oil in the engine is reduced in volume the oil pump produces less air pressure in the line 17—16 the diaphragm contracts, thus retracting peg 21P and the leaf springs are separated, breaking the electric circuit.

However, electric circuit must be closed to start the engine at which time there is of course no contact of the spring leaves as there is no pressure to expand the diaphragm. Therefore I have made the pin 20 oscillatable so that by means of manipulating the lever 19 the peg 20P may be made to push the spring leaf 23 into contact with 23A. For this reason hub 19H is slidable on the outer end part of shaft 12S. Said latter shaft is provided with a deep lateral notch 28 at its rear end widened rearwardly at one side to provide a transverse shoulder 28S. 29 is a radial pin fixed in shaft 20 to engage and ride in the notch just described.

It will now be more readily understood that when an engine is to be started electric circuit is first closed as follows:— The operator turns lever 13 until pin 29 is alined with the deepest part of the notch 28 and pushes the lever forward (against the pressure of spring 22) until peg 20P pushes leaf spring 23 into contact with leaf spring 23A the latter being at this time retracted (full line position Fig. 2). Operator then releases lever and the torque of spring 22 then presses the pin 29 against the side of the slot 28, this torque being sufficient to hold the shaft in circuit closing position while the engine is being started. Then when the engine is going and its oil pump sets up pressure in line 17—16, the diaphragm expands pressing the contacted spring leaves rearwardly until the shaft 20 is retracted to a position where pin 29 is sprung transversely (sidewise) into the wider part of the notch 28 and rests on the shoulder 28S. The torque of spring 22 keeps the peg in the latter position, the contact peg 20P at this time being in full line position shown in Fig. 2. The continued pressure within the diaphragm maintains contact between the spring leaves as long as the oil pump of the engine is operating efficiently and circuit is not broken until the diaphragm contracts and the spring leaves are separated.

I have now fully set forth the simple automatic and manual action and manipulation of my device. Reduced pressure in the diaphragm for either of the reasons herein stated positively opens the electric circuit of the engine and stops its operation. The operator is warned by the stopping of the engine that the amount of oil in the engine is low and must be replenished in order to avoid costly damage to the engine.

In Fig. 3 is shown a face view of the dial and the lever 19. The lever may be in vertical position as shown when the engine is running and driving conditions are normal. However, to start as above described the operator turns the lever to the position indicated by the diametrical dotted line and presses the lever forward to get the initial electric circuit closing action described.

The use of my device has been fully disclosed simultaneously with description of its construction. Various modifications as to structure and detail may be made without departing from the scope and spirit of the invention.

I claim:

1. An electric circuit opening and closing device for motor vehicles having an oil circulating pump and an oil gage operated by air pressure generated by the said pump; said device comprising a cylindrical housing, a pair of L-shaped spring leaves of electro-conductive material, in the electric circuit of the motor, said leaves fixed in diametrically opposite walls of said cylinder and their free ends normally positioned in spaced parallel relation and overlapped at the central part of the housing, an expansible element in one end of the cylinder in proximity to one spring leaf and connected with the gage air line and adapted when expanded to contact and move the adjacent spring leaf to contact the other spring leaf and close electric circuit, means mounted on the opposite side of the housing in alinement with said first described leaf contact means, to engage and press said spring leaves together for closing circuit, said latter means yieldable but maintaining electric contact of the leaves when the expansible element is expanded by air pressure therein and also adapted to maintain electric contact when the expansible element is contracted.

2. In a circuit opening and closing device for motor vehicles having an oil pump, an air line in which pressure is generated by the pump, a cylindrical housing with an expansible diaphragm closing one end of the housing and suitably connected with said air line, a pair of electro conductive spring leaves in said circuit and mounted in said housing and positioned in normally spaced parallel and overlapped relation at their free ends, means fixed on said diaphragm continuously contacting one spring leaf and movable by the expansion of the diaphragm to cause contact of both leaves and close electric circuit; the end of the housing opposite the diaphragm comprising a solid wall, a fixed tubular bearing extending outward therefrom, a reciprocable and rotatable shaft retained in said bearing and the inner end of which contacts one spring leaf, an indicator and manipulator lever fixed on the exterior end of said shaft, a tension coil spring about said shaft within the housing and continuously pressing the shaft outward, said coil spring fixed to said shaft and to the housing in a manner to permit but resist rotation of the shaft.

3. The structure specified in claim 2, said tubular bearing of the housing formed at its exterior end with an L-shaped slot extending inwardly longitudinally, a radial peg in said shaft and slidable in said slot, said manipulator lever having a hub portion normally inclosing said slotted outer end of the bearing and said lever adapted to be engaged to oscillate the shaft and push it forward with its radial peg riding in the narrow forward part of the L-shaped slot, said forward movement for the purpose of contacting the leaf springs, the peg to frictionally contact the side of the slot by the torque of the spring and thus initially retain the spring leaves in circuit closing contact and the shaft adapted to recede automatically when the diaphragm is expanded, as shown and described.

OSCAR L. OLSON.